US006552298B1

(12) United States Patent
Wagner

(10) Patent No.: US 6,552,298 B1
(45) Date of Patent: Apr. 22, 2003

(54) APPARATUS AND METHOD FOR MAKING A LENS ON THE END OF AN OPTICAL WAVEGUIDE FIBER

(75) Inventor: Robert S. Wagner, Corning, NY (US)

(73) Assignee: Corning Incorporated, Corning, NY (US)

( * ) Notice: Subject to any disclaimer, the term of this patent is extended or adjusted under 35 U.S.C. 154(b) by 10 days.

(21) Appl. No.: 09/966,916

(22) Filed: Sep. 28, 2001

(51) Int. Cl.[7] .......................... B23K 26/00; B23K 26/20
(52) U.S. Cl. ............................... 219/121.63; 219/121.69
(58) Field of Search .................... 219/121.6, 121.61, 219/121.63, 121.64, 121.68, 121.69, 121.85

(56) References Cited

U.S. PATENT DOCUMENTS

| | | | |
|---|---|---|---|
| 4,269,648 A | 5/1981 | Dakss et al. ................. 156/293 |
| 4,701,011 A | 10/1987 | Emkey et al. ............ 350/96.18 |
| 4,737,006 A | 4/1988 | Warbick ................... 350/96.18 |
| 4,844,580 A | 7/1989 | Lynch et al. .............. 350/96.18 |
| 4,854,663 A | 8/1989 | Borsuk et al. .............. 350/96.2 |
| 4,932,989 A | * 6/1990 | Presby |
| 4,962,988 A | 10/1990 | Swann ..................... 350/96.18 |
| 5,011,254 A | * 4/1991 | Edwards et al. |
| 5,117,473 A | 5/1992 | Pan ............................. 385/33 |
| 5,172,271 A | 12/1992 | Sinclair ....................... 359/652 |
| 5,185,836 A | 2/1993 | Baker ........................... 385/61 |
| 5,282,088 A | 1/1994 | Davidson .................... 359/664 |
| 5,293,438 A | 3/1994 | Konno et al. .................. 385/35 |
| 5,384,874 A | 1/1995 | Hirai et al. .................... 385/34 |
| 5,402,510 A | 3/1995 | Kalonji et al. ................. 385/33 |
| 5,455,879 A | * 10/1995 | Modavis et al. |
| 5,457,759 A | 10/1995 | Kalonji et al. ................. 385/31 |
| 5,459,803 A | 10/1995 | Yamane et al. ................ 385/33 |
| 5,551,968 A | 9/1996 | Pan .............................. 65/387 |
| 5,608,831 A | 3/1997 | Pan .............................. 385/85 |
| 5,751,871 A | * 5/1998 | Krivoshlykov et al. |
| 5,841,921 A | 11/1998 | Wallace ........................ 385/46 |
| 5,917,985 A | 6/1999 | Im ............................... 385/140 |
| 6,033,515 A | 3/2000 | Walters et al. ............ 156/272.8 |

FOREIGN PATENT DOCUMENTS

JP 04-288509 2/1991

OTHER PUBLICATIONS

Konno et al., Optical coupling between microlensed fiber terminals, OFC '95 Technical Digest, pp. 104–105.
Nobuo Imaizumi, Special Article: Emerging Photoelectronic Technology: In–line optical isolator, Electronic materials, Jul. 1997, pp. 70–74.

* cited by examiner

Primary Examiner—Samuel M. Heinrich
(74) Attorney, Agent, or Firm—Eric M. Smith; Timothy M. Schaeberle

(57) ABSTRACT

The present invention relates to an apparatus and method for making a lens on the end of an optical waveguide fiber. The apparatus includes a laser, wherein the laser emits a laser beam. The apparatus further includes a beam expander disposed to receive the laser beam, whereby the beam expander increases the diameter of the laser beam, thereby producing an expanded laser beam. The apparatus further includes a first aperture disposed within the expanded laser beam, wherein the first aperture blocks a portion of the expanded laser beam, and a second aperture disposed within the expanded laser beam, wherein the second aperture blocks a portion of the expanded laser beam. The apparatus further includes a first mirror disposed in the path of the expanded laser beam wherein the first mirror redirects the expanded laser beam. The apparatus further includes a focusing mirror disposed to receive the expanded laser beam, wherein the focusing mirror focuses the expanded laser beam thereby forming a heat zone. The apparatus further includes a first positioner disposed to selectively position at least a portion of a lens preform within the heat zone, and a second positioned disposed to selectively position at least a portion of an optical waveguide fiber within the heat zone.

22 Claims, 10 Drawing Sheets

FIG. 14
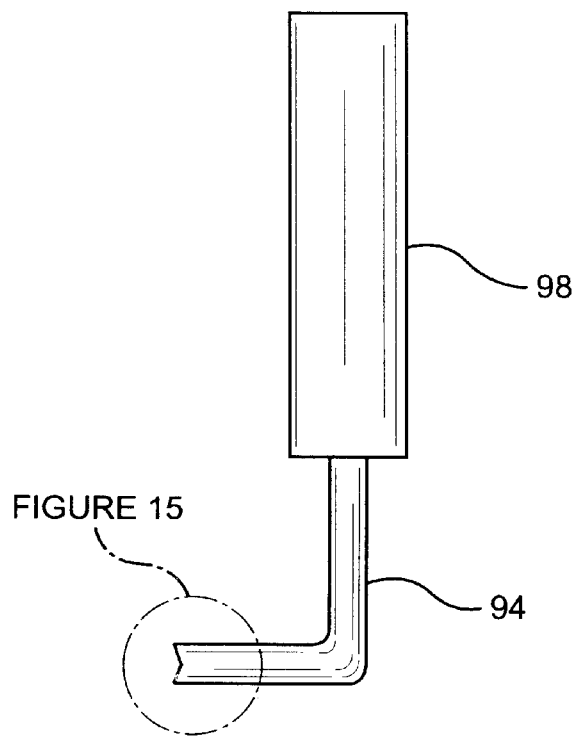
FIGURE 15
FIG. 15
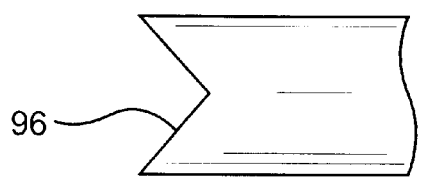

APPARATUS AND METHOD FOR MAKING A LENS ON THE END OF AN OPTICAL WAVEGUIDE FIBER

BACKGROUND OF THE INVENTION

1. Field of the Invention

The present invention relates generally to lenses for optical waveguide fibers, and particularly to an apparatus and method of making lenses for optical waveguide fibers.

2. Technical Background

Advances in optical communications have generated significant need for optical components that involve light being transmitted to or from an optical fiber through free-space to interact with or pass through one or more optical device. A wide variety of passive and active optical devices exist, some simple examples including thin-film filters or birefringent elements, and some of the more complex being large scale three-dimensional switch fabrics. Other uses for free-space optical components include injecting light from a laser diode into an optical fiber, transmitting light through free-space from one optical fiber to another (such as an amplifier fiber) or projecting light from an optical fiber to a detector.

In optical components utilizing free-space transmission of light (sometimes called micro-optic components), the light beam is often either expanded and collimated into approximately parallel rays from the exposed end of an optical fiber, or conversely focused from an expanded beam into a narrower beam capable of being injected into the end of the optical fiber at a desired angle of incidence. While other functions may be performed on the light beam exiting or entering an optical fiber, collimating and focusing are the functions that are most commonly encountered in micro-optic components.

In order to accomplish the collimating or focusing functions within the specifications required for optical communications, cylindrically-shaped gradient-index (GRIN) lenses employing graduated radial refractive index profiles have become the most prevalent conventional alternative. However, commercially-available GRIN lenses are expensive, difficult to manufacture, and present certain disadvantages in assembling, aligning, and tuning the optical components.

Several other approaches to fabricating collimating or focusing lenses for optical components are known. Axial GRIN lenses, molded polymer and glass lenses having spherical and aspherical lens surfaces, composite or complex lens elements, optical fibers having integral lenses formed by processes such as thermal expansion or diffusion, and ball lenses are among the many alternatives.

Thus there exits a need for a method of making lower cost precision lenses for optical components.

SUMMARY OF THE INVENTION

One aspect of the invention is an apparatus for making a lens on the end of an optical waveguide fiber. The apparatus includes a laser, wherein the laser emits a laser beam. The apparatus further includes a beam expander disposed to receive the laser beam, whereby the beam expander increases the diameter of the laser beam, thereby producing an expanded laser beam. The apparatus further includes a first aperture disposed within the expanded laser beam, wherein the first aperture blocks a portion of the expanded laser beam, and a second aperture disposed within the expanded laser beam, wherein the second aperture blocks a portion of the expanded laser beam. The apparatus further includes a first mirror disposed in the path of the expanded laser beam wherein the first mirror redirects the expanded laser beam. The apparatus further includes a focusing mirror disposed to receive the expanded laser beam, wherein the focusing mirror focuses the expanded laser beam thereby forming a heat zone. The apparatus further includes a first positioner disposed to selectively position at least a portion of a lens preform within the heat zone, and a second positioned disposed to selectively position at least a portion of an optical waveguide fiber within the heat zone.

In another aspect, the present invention includes method for making a lens on the end of an optical waveguide fiber. The method includes the step of providing an optical waveguide fiber, the optical waveguide fiber having at least one end. The method further includes the steps of providing a lens preform and of coupling the lens preform to the at least one end, thereby forming a junction. The method further includes the steps of determining the volume of the lens to be formed, determining the length of the lens preform that corresponds to the determined volume and removing the portion of the lens preform that is in excess of the volume of the lens to be formed. The method further includes the step of forming the lens.

One advantage of the present invention is that it is a monolithic lens and fiber assembly.

Another advantage of the present invention is that only a single surface requiring an anti-reflective coating is produced.

Another advantage of the present invention is that it has lower polarization dispersion losses than gradient index (GRIN) lenses.

Another advantage of the present invention is that compared to ball lenses there are no micro cracks.

Another advantage is that the manufacturing costs of the present invention are lower than the manufacturing costs associated with either ball or GRIN lenses.

Another advantage of the present invention is that it may be used to make divergent beam lenses.

Another advantage of the present invention is that it may be used to make tightly focusing beam lenses.

Another advantage of the present invention is that it may be used to make collimating lenses.

Another advantage of the present invention is that it may be used to make lenses for efficiently coupling optical waveguide fibers to laser diodes.

Another advantage of the present invention is that the coating does not have to be removed from the optical waveguide fiber before forming the lens on the end of the optical waveguide fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely illustrative of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 14 is a side elevation view of one embodiment of a fiber holder used in the apparatus of FIG. 1; and FIG. 15 is an enlarged fragmentary view of a portion of the fiber holder shown in FIG. 14.

DETAILED DESCRIPTION OF THE PREFERRED EMBODIMENTS

Figure 1:
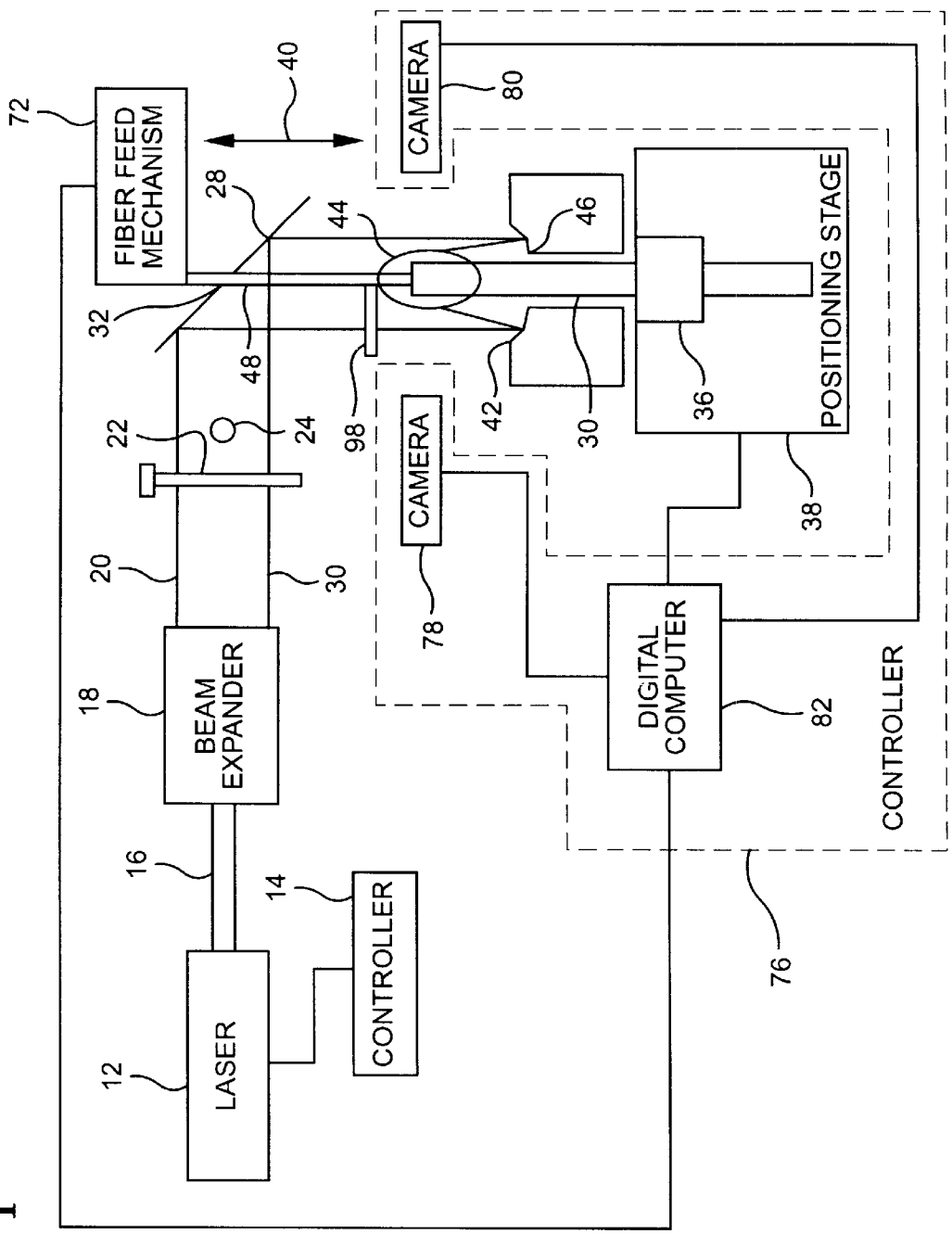
FIG. 1 is a schematic diagram of an apparatus embodiment of the present invention.

Reference will now be made in detail to the present preferred embodiments of the invention, examples of which are illustrated in the accompanying drawings. Whenever possible, the same reference numerals will be used throughout the drawings to refer to the same or like parts.

One embodiment of the present invention is an apparatus for making lenses on the end of an optical waveguide fiber is shown in FIG. 1 and is designated generally throughout by the reference numeral 10.

The present invention for an apparatus 10 for making lenses on the end of an optical waveguide fiber includes a laser 12, such as, for example a 10W $CO_2$ laser having a wavelength of 10.6 µm. The laser is coupled to a controller 14 that controls the duration and power of the laser beam 16. In one embodiment the laser 12 emits a laser beam 16 having a spot size of 3 mm. It will be apparent to those skilled in the pertinent art, however, that the spot size of the laser beam 16 and output power of the laser 12 are design choices that may very with the optics used in the apparatus 10 or with the desired lens geometry.

The apparatus 10 also includes a beam expander 18 disposed to expand the spot size of the laser beam 14. The beam expander 18 emits an expanded laser beam 20 having a decreased energy density. In one embodiment of the present invention, the beam expander is a 4X beam expanded and increases the spot size of the laser beam 16 from about 3 mm to about 12 mm.

Figure 2:
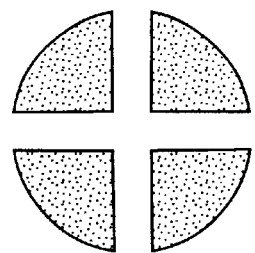
FIG. 2 is a cross section of a partially blocked laser beam in accordance with the present invention.

A first aperture 22 and a second aperture 24 are disposed in the path of the expanded laser beam 20. The first and second apertures 22, 24 are orthogonal to the expanded laser beam 20 and to one another. The first and second apertures 22, 24 block a cruciform section of the expanded laser beam 20. Preferably, the center of the cruciform section of the expanded laser beam 20 that is blocked by the first and second apertures 22, 24 is coincident with the center of the expanded laser beam 20. FIG. 2 shows cross section of the expanded laser beam 20 at the plane 26. The blocked cruciform section of the expanded laser beam 20 is useful in balancing the energy distribution of to the expanded laser beam 20. Returning to FIG. 1, the first and second apertures 22, 24 may be, for example, stainless steel rods with a diameter of about 1.5 mm.

Figure 3:
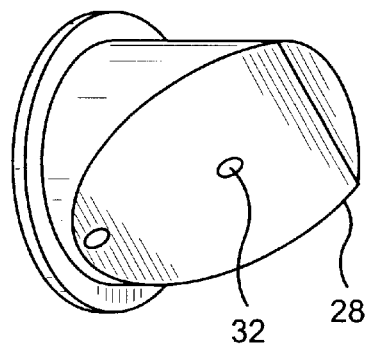
FIG. 3 is a perspective view of one embodiment of a flat mirror used in the apparatus of FIG. 1.
Figure 4:
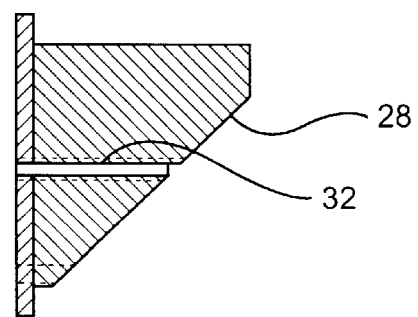
FIG. 4 is a cross sectional view of the flat mirror if FIG. 3.

The apparatus 10 also includes a flat mirror 28. The flat mirror 28 is inclined at an angle of about 45 degrees with respect to the axis 30 of the expanded laser beam 20. The flat mirror 28 may be, for example, a copper mirror. FIG. 3 and FIG. 4 show one possible embodiment of the flat mirror 28. The flat mirror 28 is adapted to allow an optical waveguide fiber 48, such as for example a SMF-28™ optical waveguide fiber, available from Corning Incorporated of Corning, N.Y. USA, to pass through the flat mirror 28. Preferably, the flat mirror 28 is configured with an opening 32, such as, for example a hole or slot, that allows the optical waveguide fiber 48 to positioned in the center of the reflected laser beam 34. Preferably, the opening for optical waveguide fiber 48 in the flat mirror 28 is located in the mirror so as to fall within the blocked portion of the expanded laser beam 20.

The apparatus 10 also includes a fiber feed mechanism 72. The fiber feed mechanism 72 is positioned above the flat mirror 28 and feeds the optical waveguide fiber 48 through the opening 32. The fiber feed mechanism 72 is capable of moving the optical waveguide fiber 48 in reciprocal motion parallel to the axis of the reflected laser beam 34 as indicated by the arrow 74. The fiber feed mechanism 72 is also capable of moving the optical waveguide fiber 48 in a plane transverse to the axis of the reflected laser beam 34. The fiber feed mechanism 72 may include a fiber holder 78. In one embodiment, as shown in FIG. 14 and FIG. 15, the fiber holder 78 is vacuum device that uses suction to hold the end of the optical waveguide fiber 48. The fiber holder 78 includes a tube 94, as shown in FIG. 15, the end of the tube 94 is notched to receive the optical waveguide fiber 48. Suction holds the optical waveguide fiber 48 against a reference surface 96. The fiber holder 78 provides a way to securely hold the optical waveguide fiber 48 while at the same time inhibiting damage to the fiber while the position of the optical waveguide fiber 48 is being manipulated.

In one embodiment the fiber feed mechanism 72 includes a positioning stage capable of translation in three orthogonal directions (X, Y, Z) and three actuators for driving the positioning stage. The positioner stage is located so that the X–Y plane of the positioner stage is transverse to the reflected laser beam 34 and preferably the reflected laser beam 34 is orthogonal to the X–Y plane of the positioner stage. The optical waveguide fiber 48 is mounted to the positioner, such as, for example a Newport 562 position stage, available from Newport Corporation of Irvine, Calif., USA. Two actuators, such as, for example, Newport 850G closed loop Precision Actuators, available from Newport Corporation of Irvine, Calif., USA, drive the positioning stage in the X and Y directions. A third actuator, such as, for example a commercially available, stepper motor or servo having a 0.1 μm step may be used to drive the positioner stage in the Z direction, thereby allowing the optical waveguide fiber 48 to be brought into contact with a lens preform 30. The displacement of the actuators and hence the position of the optical waveguide fiber 48 is controlled by a controller 76 that will be described in more detail below.

Figure 5:
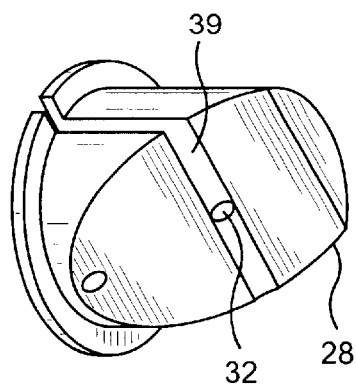
FIG. 5 is a perspective view of an alternative embodiment of the flat mirror shown in FIG. 3.

Returning to FIG. 1, the lens preform 30 is secured by a clamp 36 to a positioning stage 38 capable of translation along three (3) orthogonal axes (X, Y, Z), such as, for example a Newport 562 position stage, available from Newport Corporation of Irvine, Calif., USA. The positioning stage 38 is located so that the X–Y plane of the positioner stage is transverse to the expanded laser beam 20 and preferably the reflected laser beam 34 is orthogonal to the X–Y plane of the positioner stage. Two actuators, such as, for example, Newport 850G closed loop Precision Actuators, available from Newport Corporation of Irvine, Calif., USA, drive the positioning stage in the X and Y directions. This allows the lens preform 30 to be positioned within the reflected laser beam 34. A third actuator, such as, for example a commercially available, stepper motor or servo having a 0.1 μm step may be used to drive the positioner stage in the Z direction In an alternative embodiment, as shown in FIG. 5, the flat mirror 28 includes a groove 39 machined into the reflective surface. The groove 39 replaces the second aperture 26 while still producing an expanded laser beam with a centrally located cruciform section removed from the beam.

Returning to FIG. 1, the apparatus 10 also includes a focusing mirror 42. The focusing mirror 42 is an axisymmetric focusing mirror that focuses the expanded laser beam to a heat zone 44. The focusing mirror 42 includes an opening 46 sized to allow a lens preform 30, such as for example a glass rod to pass through the focusing mirror 42. The lens preform 30 is a glass body, such as, for example a cylinder of glass. The shape of the preform depends upon the final geometry of the lens to be formed and may be any geometric cross-section, such as, for example circular, triangular, rectangular, hexagonal, octagonal, annular, C-shaped, V-shaped, or H-shaped. The lens preform 30 may be, for example, a glass rod, such as, for example a silica glass rod having a diameter in the range from about 100 μm to about 350 μm. The lens preform 30 has a chemical composition chosen to allow the lens preform to be coupled to the optical waveguide fiber and have a desired refractive index so that lens formed on the end of the optical waveguide fiber will have desirable geometric and optical characteristics. Preferably, the opening 46 is disposed to allow the lens preform 30 to be positioned coincident with the axis of symmetry of the focusing mirror 42.

Figure 6:
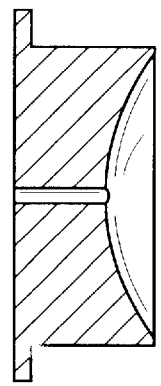
FIG. 6 is a cross sectional view of a spherical mirror embodiment of the focusing mirror used in the apparatus of FIG. 1.
Figure 7:
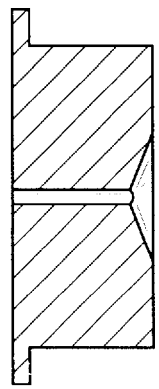
FIG. 7 is a cross sectional view of a conical mirror embodiment of the focusing mirror used in the apparatus of FIG. 1.
Figure 8:
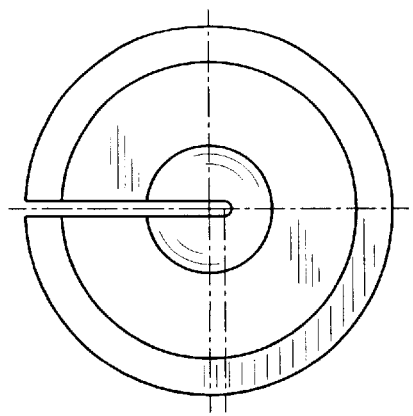
FIG. 8 is a top plan view of the conical mirror of FIG. 7.
Figure 9:
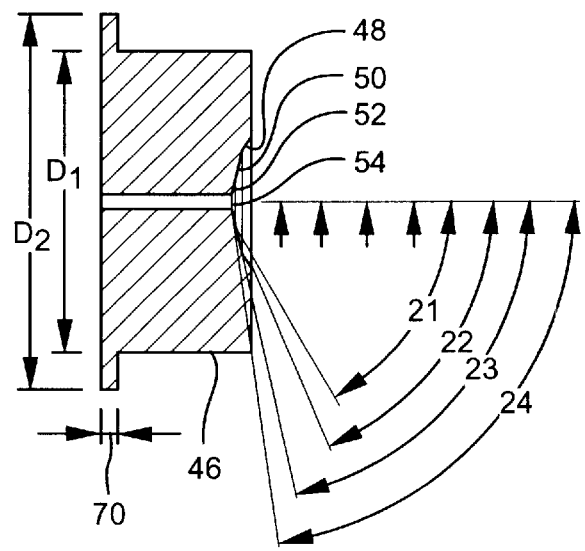
FIG. 9 is a cross sectional view of a multi-conical mirror embodiment of the focusing mirror used in the apparatus of FIG. 1.
Figure 10:
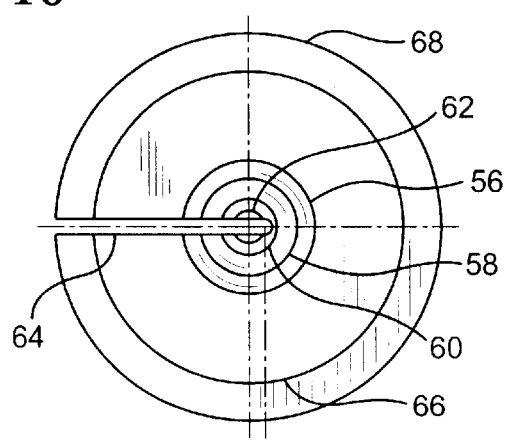
FIG. 10 is a top plan view of the multi-conical mirror of FIG. 9.

The focusing mirror 42 may be, for example, a spherical mirror, a parabolic mirror, a conical mirror or a multi-conical mirror. FIG. 6 shows a cross sectional view of a spherical mirror embodiment of the focusing mirror 42. FIG. 7 shows a cross sectional view of a conical mirror embodiment of the focusing mirror 42, while FIG. 8 is a top plan view of the conical mirror embodiment of the focusing mirror 42. An example of a multi-conical mirror is shown in FIG. 9 and FIG. 10. The choice of the type of mirror to use as the focusing mirror 42 depends upon the desired dimensions and energy distribution of the heat zone 44. For a spherical mirror, the size of the heat zone 44 is independent of the size of the reflected laser beam 34. When the focusing mirror 42 is a spherical mirror, the energy density of the heat zone 44 is dependent upon the surface finish of the spherical mirror. For example if the energy density of the heat zone 44 is too great, it may be reduced by increasing the surface roughness of the spherical mirror. Conversely, if the if the energy density of the heat zone 44 is too low, it may be increased by decreasing the surface roughness of the spherical mirror. The size of the heat zone 44 from a spherical mirror is very small, the spherical mirror essentially focuses the reflected laser beam 34 to a single point.

Figure 10A:
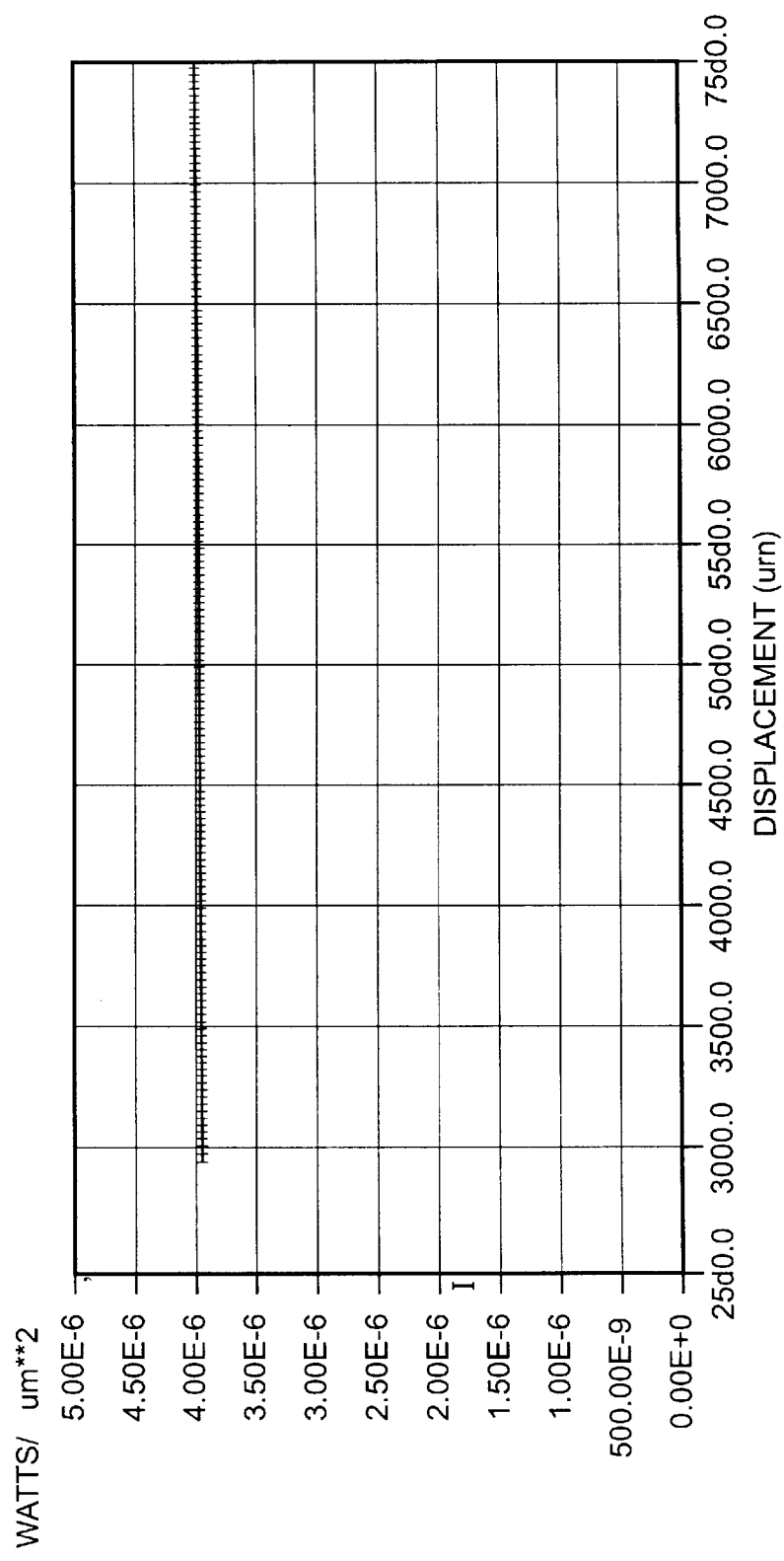
FIG. 10A is a graphical representation of the typical energy density as a function of length in the heat zone of the apparatus of FIG. 1 when the focusing mirror is a conical mirror.

For conical and multi-conical mirrors, such as, for example those shown in FIGS. 7, 8, 9, and 10, the size of the heat zone 44 depends upon the size of the reflected laser beam 34. As shown in FIG. 10A, a conical mirror focuses a laser beam coincident with the axis of symmetry of the mirror into a heat zone 44 having a uniform energy density over a discrete length. For example, for a laser beam with a diameter of 12 mm and a conical mirror with a cone angle of about 143 degrees, the heat zone 44 has a length of about 3 mm. The type of focusing mirror 42 used in important in being able to tailor the energy density throughout the heat zone 44.

Figure 10B:
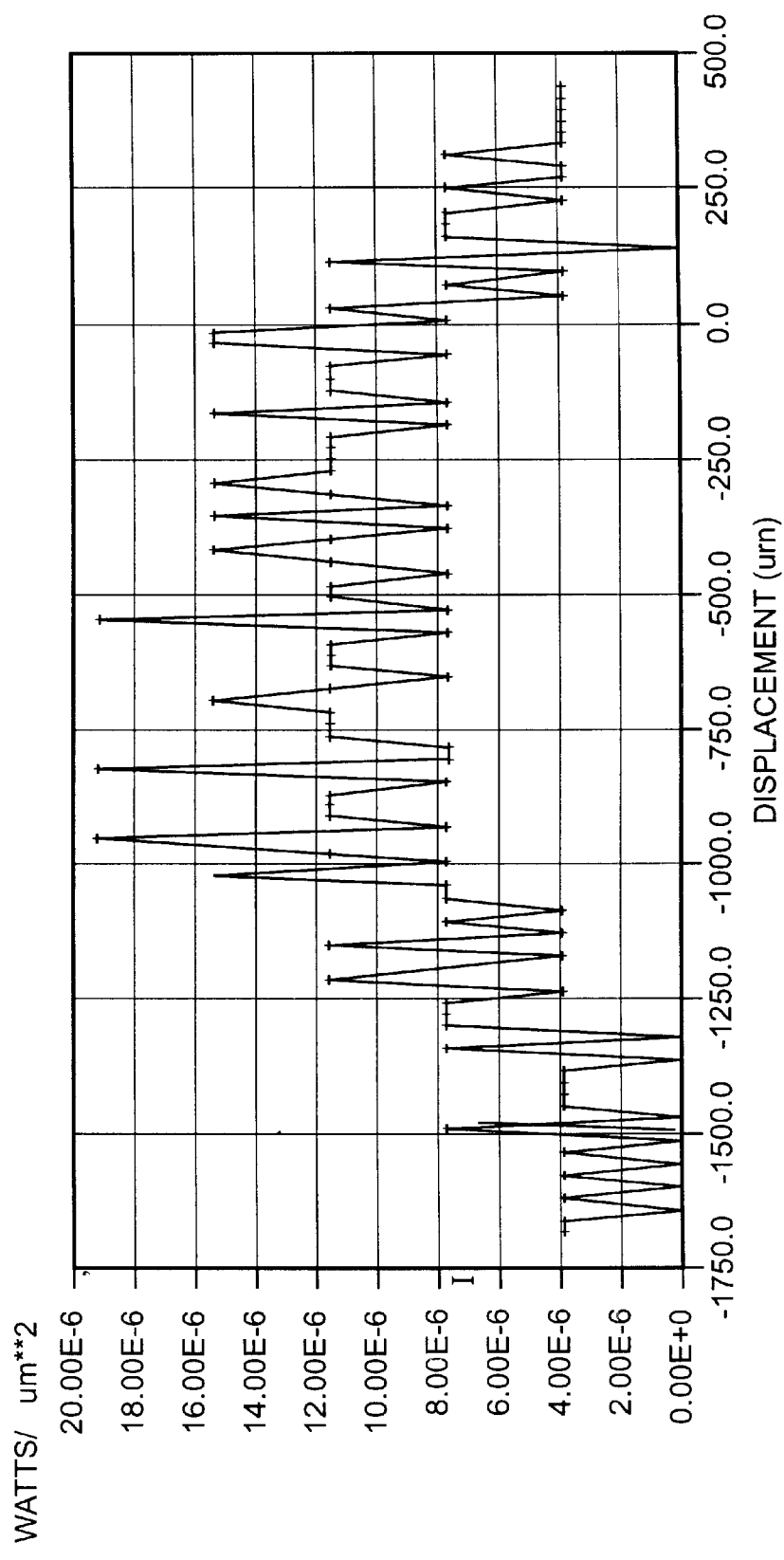
FIG. 10B is a graphical representation of the typical energy density as a function of length in the heat zone of the apparatus of FIG. 1 when the focusing mirror is a multi-conical mirror.

FIG. 9 is a cross-sectional view of a multi-conical mirror 46 that may be used as the focusing mirror 42. The multi-conical mirror 46 shown in FIG. 9 and FIG. 10 includes 4 conical surfaces 49, 50, 52, 54. The first conical surface 49 has a base diameter 56 of about 0.348 inch and a cone angle $\alpha_1$ of about 120 degrees. The second conical surface 50 has a base diameter 58 of about 0.252 inch and a cone angle $\alpha_2$ of about 136 degrees. The third conical surface 52 has a base diameter 60 of about 0.142 inch and a cone angle $\alpha_3$ of about 156 degrees. The fourth conical surface 54 has a base diameter 62 of about 0.080 inch and a cone angle $\alpha_4$ of about 166 degrees. This particular arrangement of base diameters and cone angles, in conjunction with a laser beam 14mm in diameter incident upon the multi-conical mirror 46, results in a heat zone 44 of 1 mm in length and an axial energy distribution profile as shown in FIG. 10B. The multi-conical mirror 46 shown in FIG. 9 and FIG. 10 also includes a slot 64. The slot 64 is about 0.040 inch wide and extends about 0.060 inch past the center of the multi-conical mirror 46. The multi-conical mirror 46 is made of Tellurium Copper. As shown in FIG. 9 and FIG. 10 the multi-conical mirror 46 includes a cylindrical potion 66 having a diameter $D_1$ of about 0.800 inch and a height of about 0.345 inch. The multi-conical mirror 46 also includes a mounting ring 68 having a diameter $D_2$ of about 1.000 inch and a thickness 70 of about 0.050 inch.

As will be appreciated by those of ordinary skill in the optical arts, the number of conical surfaces as well as the size and cone angles of the conical surfaces are all variables that may be changed individually or in combination to produce a heat zone 44 of desirable dimension and energy distribution for a particular application.

The size and shape of the first and second apertures 24, 26 and the optical characteristics of the focusing mirror 42 control the shape of the lens. In some optical applications for example it may be desirable to have a lens that has different radii of curvature in orthogonal directions, such as, for example when optically coupling an optical waveguide fiber to the elliptical beam from a laser diode.

Returning to FIG. 1, the apparatus 10 also includes a positioning stage 38. The positioning stage 38 is positioned below the focusing mirror 42 and feeds the optical waveguide fiber 48 through the opening 46. The positioning stage 38 is capable of moving the lens preform 30 in reciprocal motion parallel to the axis of symmetry of the focusing mirror 42 as indicated by the arrow 74. The positioning stage 38 is also capable of moving the optical waveguide fiber 48 in a plane transverse to the axis of symmetry of the focusing mirror 42.

In one embodiment the fiber feed mechanism 72 includes a positioning stage capable of translation in three orthogonal directions (X, Y, Z) and three actuators for driving the positioning stage. The positioner stage is located so that the X–Y plane of the positioner stage is transverse to the expanded laser beam 20 and preferably the expanded laser beam 20 is orthogonal to the X-Y plane of the positioner stage. The optical waveguide fiber 48 is mounted to the positioner, such as, for example a Newport 562 position stage, available from Newport Corporation of Irvine, Calif., USA. Two actuators, such as, for example, Newport 850G closed loop Precision Actuators, available from Newport Corporation of Irvine, Calif., USA, drive the positioning stage in the X and Y directions. A third actuator, such as, for example a commercially available, stepper motor or servo having a 0.1 μm step may be used to drive the positioner stage in the Z direction, thereby allowing the optical waveguide fiber 48 to be brought into contact with the lens preform 30. The displacement of the actuators and hence the position of the optical waveguide fiber 48 is controlled by a controller 76. The controller 76 is connected to the positioning stage 38 and the fiber feed mechanism 72. The controller 76 aligns the lens preform 30 and the optical waveguide fiber 48 with one another.

The controller 76 includes a first camera 78 and a second camera 80. The first and second cameras 78, 80 may be, for example, NTSC analog cameras, such as, for example Dage MTI CCD-100 cameras available DAGE-MTI Incorporated of Michigan City, Ind. The first and second cameras 78, 80 are located such that the heat zone 44 is substantially centered within the respective field of views of first and second cameras 78, 80. Preferably the first and second cameras 78, 80 are coplanar with one another and are located so that their respective fields of view are approximately orthogonal to one another. Additionally, although not required, it is preferable that the plane in which the first and second cameras 78, 80 are located is perpendicular to the expanded laser beam 20.

Figure 11:
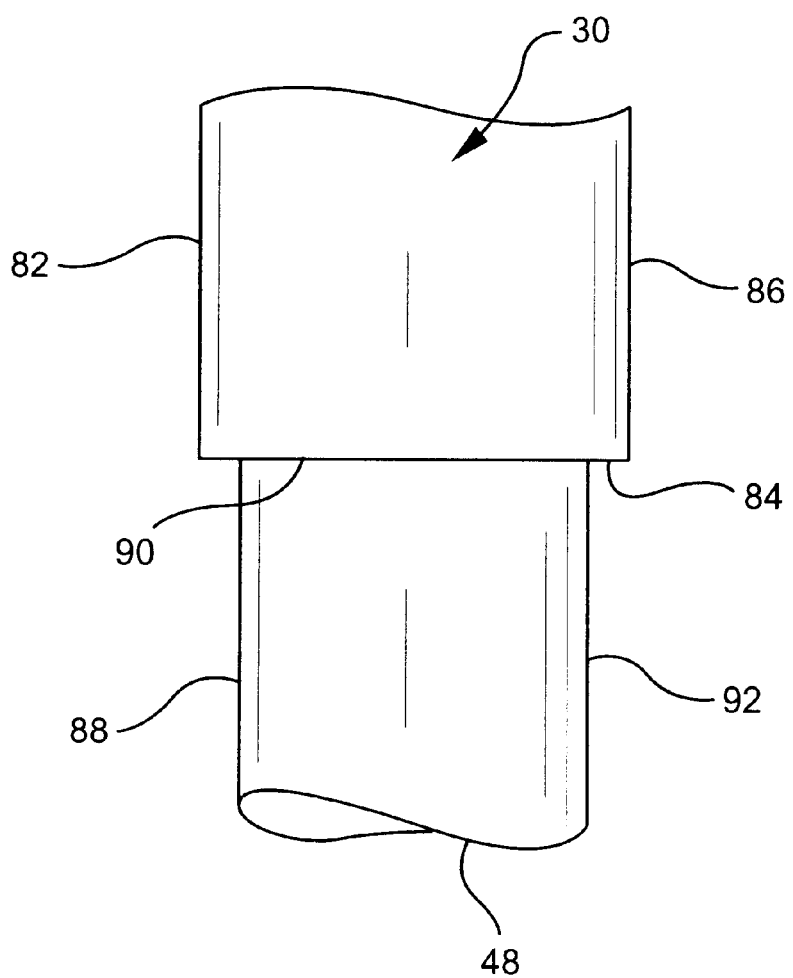
FIG. 11 is a side elevation view of the lens preform and optical waveguide fiber acted upon by the apparatus of FIG. 1 prior to alignment and forming the lens.
Figure 12:
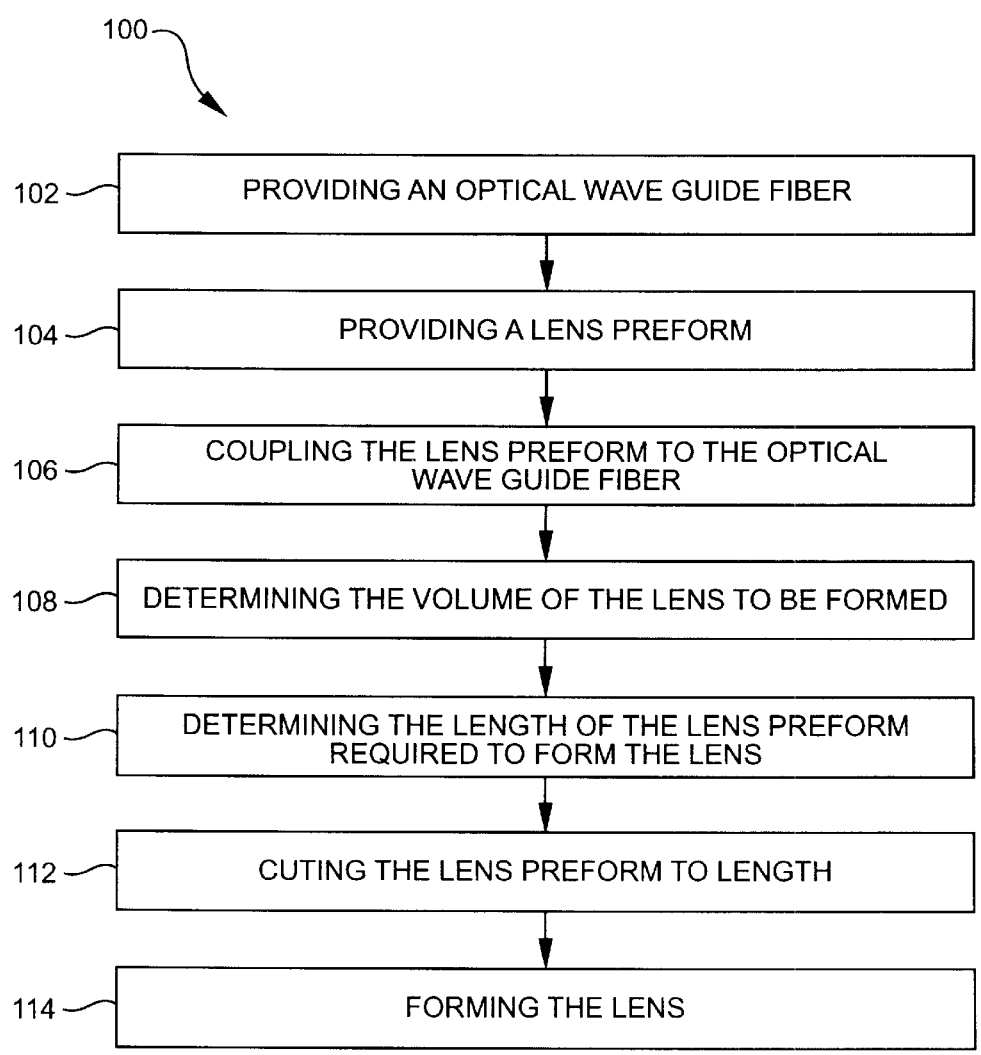
FIG. 12 is a flowchart showing the fabrication steps of one embodiment of the present invention in block diagram form.
Figure 13:
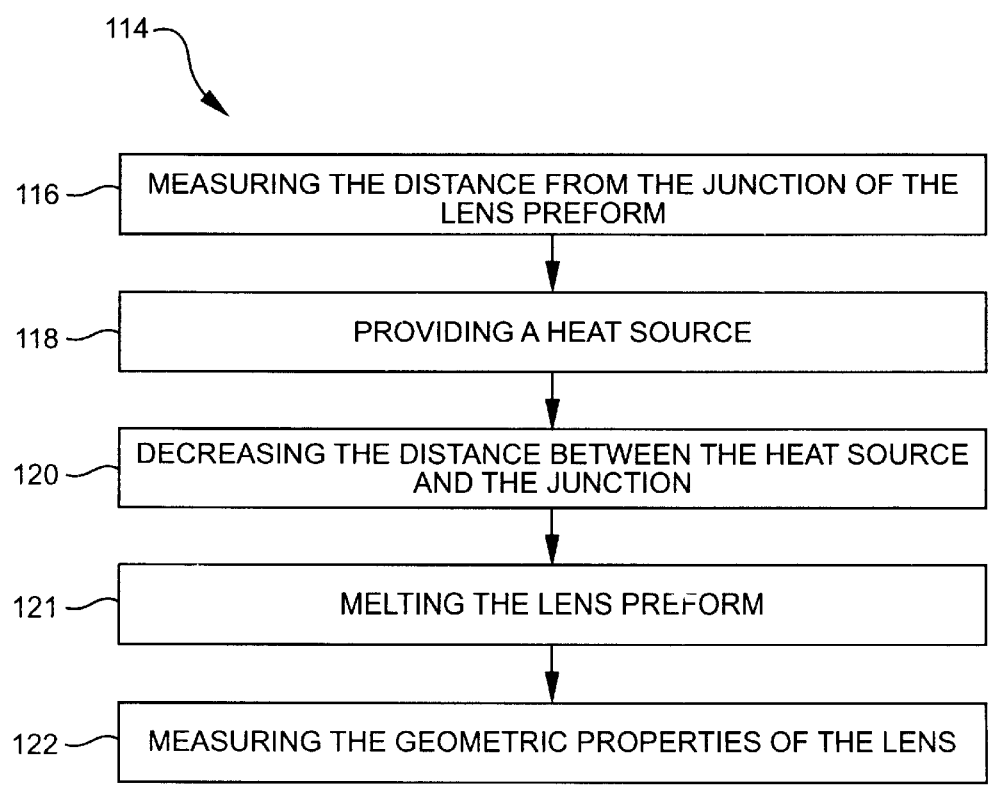
FIG. 13 is a flow chart showing the fabrication steps of one embodiment of the lens forming step of FIG. 12.

The first and second cameras 78, 80 each transmit a digital image to a digital computer 82. An example of a digital image transmitted by either the first or second camera 78, 80 is shown in FIG. 11. The digital computer 82 uses a edge detection algorithm, such as for example a SORBEL algorithm to identify the edges 83, 84, 86 of the lens preform 30 and the edges 88, 90, 92 optical waveguide fiber 72.

After the edges 83, 84, 86, 88, 90, 92 are detected the digital computer 80 determines the physical location of the edges 82, 84, 86, 88, 90, 92 with respect to a predetermined coordinate system. A mode filter algorithm has proven useful in reliably determining the location of the edges 83, 84, 86, 88, 90, 92 within the reference coordinate system. Once the location of the edges 83, 84, 86, 88, 90, 92 within the reference coordinate system are determined the digital computer 80 directs the positing stage 38 and fiber feed mechanism 72 to move the lens preform 30 and the optical waveguide fiber 48 into alignment with one another. The lens preform 30 is then fused to the optical waveguide fiber 48 and if necessary cut to length. The lens preform 30 is moved into the heat zone 44 and a lens is formed by melting the lens preform 30 and allowing the surface tension of the melted lens preform 30 to form the lens.

After the lens is formed, the digital computer 82 uses images from the first and second cameras 78, 80 to preform a geometric analysis of the lens, determining the radii of curvature in two orthogonal directions.

In an alternative embodiment, a third digital camera (not shown) is used to provide another view of the lens which the digital computer 82 uses to characterize the lens.

Another embodiment of the method for making lenses of the present invention is shown in FIG. 2 and is designated generally throughout by the reference numeral 100.

The present invention for a method 100 of making a lens on the end of an optical waveguide fiber includes the step 102 of providing an optical waveguide fiber, such as, for example SMF-28™ single mode optical waveguide fiber, available from Corning Incorporated of Corning, N.Y. The method 100 further includes the step 104 of providing a lens preform. The lens preform is a glass body, such as, for example a cylinder of glass. The shape of the preform depends upon the final geometry of the lens to be formed and may be any geometric cross-section, such as, for example circular, triangular, rectangular, hexagonal, octagonal, annular, C-shaped, V-shaped, or H-shaped.

The lens preform has a chemical composition chosen to allow the lens preform to be coupled to the optical waveguide fiber and have a desired refractive index so that lens formed on the end of the optical waveguide fiber will have desirable geometric and optical characteristics. The lens preform may, for example, be a silica glass fiber having a diameter from about 100 μm to about 300 μm when the optical waveguide fiber is SMF-28™ single mode optical waveguide fiber.

The method 100 further includes the step 106 of coupling the lens preform to the optical waveguide fiber. The lens preform may be coupled to the optical waveguide fiber by fusing the lens preform to the optical waveguide fiber. The lens preform may be fused to the optical waveguide fiber by conventional electrode arc fusion splicing techniques. Alternatively a laser, such as, for example, a $CO_2$ laser may be used to splice the lens preform to the optical waveguide fiber.

The method 100 further includes the step 108 of determining the volume of the lens to be formed. For example, for a lens having a desired overall length $L_{fl}$ and a front surface radius of curvature $R_c$ when the lens preform is circular in cross-section the total volume of the lens, $V_{lens}$, is calculated according to equation 1. It should be noted that equation 1 only provides an estimation of the volume of the desired lens.

$$V_{lens} = \pi \cdot r^2 \cdot (L_{fl} - 2 \cdot R_c) + \frac{4}{3} \cdot \pi \cdot R_c^3 \quad (1)$$

where, r is the cross-sectional radius of the lens preform.

The method 100 further includes the step 110 of determining the length of the lens preform that corresponds to the estimated volume of the desired lens. For a cylindrical lens preform, the starting length, $L_{start}$, may be estimated according to equation 2.

$$L_{start} = \frac{\left(\frac{4}{3} \cdot R_c^3\right)}{r^2} + (L_{fl} - 2 \cdot R_c) \quad (2)$$

As will be appreciated by those skilled in the pertinent art, for the starting length may be calculated by employing the appropriate geometric formulas.

The method 100 further includes the step 112 of cutting the lens preform to length. The step 112 of cutting the lens preform to length produces and endface on the lens preform. The lens preform may be cut to length using a mechanical fiber cleaver or a laser. When a laser is used in the step 106 to couple the lens preform to the optical waveguide fiber, either the lens preform moved or the laser beam is redirected so that the lens preform is sufficiently heated, at the distance equal to the starting length, $L_{start}$, from the junction of the lens preform to the optical waveguide fiber, so that melting of the lens preform is initiated and surface tension pulls the glass apart, thus completing the cut. As will be appreciated by those skilled in the pertinent art, more than one laser beam may be used, such as, for example two laser beams of equal powerdirected to opposite sides of the lens preform. Alternatively, a precut lens preform may be used thus removing the need to cut the lens preform to length after coupling the lens preform to the optical waveguide fiber.

The method 100 further includes the step 114 of forming the lens. The step of forming the lens may include the step 116 of measuring the distance from the junction of the lens preform and the optical waveguide fiber to the end of the lens preform. Based upon this measured distance, the necessary relative movement between the heat source and junction, and the power setting of the heat source that are required to form a desired lens shape may be estimated. If a precut lens preform is used the step 116 of measuring the distance from the junction of the lens preform and the optical waveguide fiber to the end of the lens preform may be omitted.

The step 114 of forming the lens of the method 100 may further include the step 118 providing a heat source, such as, for example a laser. The step 114 includes the step of applying heat to the endface of the lens preform, thereby melting the endface of the lens preform. The surface tension of the glass forms a curved front surface. The step 118 of applying heat to the endface of the lens preform may also include the step 120 of decreasing the distance between the heat source and the junction of the lens preform and the optical waveguide fiber. The distance between the heat source and the junction of the lens preform and the optical waveguide fiber may be decreased by moving the junction relative while the heat source remains stationary or by moving the heat source while the junction remains stationary. The amount that distance between the heat source and the junction of the lens preform and the optical waveguide fiber must be decreased by to form the lens is the melt back distance, $D_{MB}$. The melt back distance is estimated by equating the volume of the lens preform to be formed into the lens to the volume of the lens. For example, when the lens preform is cylindrical and the lens is spherical the volume of the lens preform required to form the lens is denoted by $V_{cylinder}$ and volume of the formed lens is denoted by $V_{sphere}$. $V_{cylinder}$ may be calculated using equation 3, where $L_{MB}$ if the length of the melt back.

$$V_{cylinder} = \pi \cdot r^2 \cdot L_{MB} \quad (3)$$

$V_{sphere}$ may be calculated according to equation 4.

$$V_{sphere} = \frac{4}{3} \cdot \pi \cdot R_c^3 \quad (4)$$

The length of the melt back, $L_{MB}$, is unknown and is determined by setting $V_{cylinder}$ equal to $V_{sphere}$ and solving for $L_{MB}$, which yields equation 5.

$$L_{MB} = \frac{\left(\frac{4}{3} \cdot R_c^3\right)}{r^2} \quad (5)$$

The melt back distance $D_{MB}$ is calculated by substituting this value of LMB into equation 6.

$$D_{MB} = L_{MB} - 2 \cdot R_c \quad (6)$$

The step 114 of forming the lens of the method 100 may further include the step 122 of measuring the geometric properties, specifically the radius of curvature, $R_c$, and length of the lens element, $L_{measured}$, as the lens as formed.

The step 114 of forming the lens of the method 100 may further include the step 124 of using the measured values of the lens length, $L_{measured}$, and radius of curvature, $R_c$, as input data for a control algorithm that controls the power of the heat source P and the relative displacement between the heat source and the junction of the lens preform and the optical waveguide fiber for the formation of the next lens.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An apparatus for making a lens on the end of an optical waveguide fiber comprising:

a laser, wherein said laser emits a laser beam;

a beam expander disposed to receive the laser beam, whereby said beam expander increases the diameter of the laser beam, thereby producing an expanded laser beam;

a first aperture disposed within said expanded laser beam, wherein said first aperture blocks a portion of said expanded laser beam;

a second aperture disposed within said expanded laser beam, wherein said second aperture blocks a portion of said expanded laser beam;

a first mirror disposed in the path of said expanded laser beam wherein said first mirror redirects said expanded laser beam;

a focusing mirror disposed to receive said expanded laser beam, wherein said focusing mirror focuses said expanded laser beam thereby forming a heat zone;

a first positioner disposed to selectively position at least a portion of a lens preform within said heat zone; and a second positioned disposed to selectively position at least a portion of an optical waveguide fiber within said heat zone.

2. The apparatus of claim 1 further including a controller;
wherein said controller is coupled to said first positioned, whereby said controller activates said first positioner to selectively position said at least a portion of said lens preform within said heat zone;
wherein said controller is coupled to said second positioner, whereby said controller activates said second positioner to selectively position said at least a portion of said optical waveguide fiber within said heat zone;
wherein said controller is coupled to said laser, whereby said controller adjust the output power of said laser.

3. The apparatus of claim 2 wherein said controller includes:
a first camera, wherein the field of view of said first camera includes said heat zone;
a second camera disposed perpendicular to said first camera, wherein the field of view of said second camera includes said heat zone;
wherein said first camera and said second camera are disposed radially with respect to said expanded laser beam; and
wherein said first and second cameras are located in a plane perpendicular to said expanded laser beam.

4. The apparatus of claim 3 wherein said controller further includes:
a digital computer coupled to said first camera and said second camera, wherein said digital computer receives a first image from said first camera and a second image from said second camera and wherein said digital computer uses said first and second images to control said first and second positioners thereby locating said lens preform and said optical waveguide fiber in a predetermined relationship to one another.

5. A method of making a lens on the end of an optical fiber comprising the steps of:
providing an optical waveguide fiber, the optical waveguide fiber having at least one end;
providing a lens preform;
coupling the lens preform to the at least one end, thereby forming a junction;
determining the volume of the lens to be formed;
determining the length of the lens preform that corresponds to the determined volume;
removing the portion of the lens preform that is in excess of the volume of the lens to be formed; and
forming the lens.

6. The method of claim 5 wherein the diameter of the lens preform is greater than the diameter of the optical waveguide fiber.

7. The method of claim 5 wherein the volume of the lens to be formed is calculated according to the formula:

$$V_{lens} = \pi \cdot \left[ \frac{4}{3} \cdot R_c^3 + r^2 \cdot (L_{fl} - R_c) \right],$$

where $L_{fl}$ is the desired overall length of the lens, $R_c$ is the desired front surface radius of curvature and r is the cross-sectional radius of the lens preform.

8. The method of claim 7 wherein the length of the cylindrical glass fiber that corresponds to the determined volume is $L_{start}$ and $L_{start}$ is calculated according to the formula:

$$L_{start} = \frac{\left( \frac{4}{3} \cdot R_c^3 \right)}{r^2} + (L_{fl} - 2 \cdot R_c).$$

9. The method of claim 5, wherein the step of providing a cylindrical glass fiber includes the step of providing a cylindrical silica glass fiber.

10. The method of claim 5 wherein the steps of:
determining the volume of the lens to be formed;
determining the length of the lens preform that corresponds to the determined volume; and
removing the portion of the lens preform that is in excess of the volume of the lens to be formed, thereby producing an endface on the lens preform;
are preformed prior to the step of coupling the lens preform to the at least one end.

11. The method of claim 5 wherein the step of forming the lens includes the step of forming an aspherical lens.

12. The method of claim 5 wherein the step of forming the lens includes the step of forming an spherical lens.

13. The method of claim 12 wherein the step of forming the spherical lens includes the steps of:
providing a heat source;
heating the endface of the lens preform; and
moving the junction a distance toward the heat source.

14. The method of claim 13 wherein the distance is a melt back displacement $D_{MB}$ estimated by the equation $$D_{MB} = \frac{\frac{4}{3} \cdot R_c^3}{r^2} - 2 \cdot R_c,$$

where $R_c$ is the desired front surface radius of curvature and r is the cross-sectional radius of the lens preform.

15. The method of claim 5 wherein the step of forming the lens includes the step of forming an ball lens.

16. The method of claim 5 further including the step of characterizing the lens.

17. The method of claim 16 wherein the step of characterizing the lens includes the step of measuring the geometry of the lens.

18. The method of claim 17 further includes the step of comparing the measured geometry of the lens to a desired lens geometry.

19. The method of claim 18 further including the step of adjusting the output of the heat source.

20. The method of claim 19, wherein the heat source is a laser and the step of adjusting the output of the heat source includes adjusting the output power of the laser.

21. The method of claim 18 further including the step of adjusting the melt back displacement.

22. The method of claim 18 further including the step of adjusting the taper cut displacement.

* * * * *